(12) United States Patent
Bagai et al.

(10) Patent No.: US 7,600,976 B2
(45) Date of Patent: Oct. 13, 2009

(54) ROTOR BLADE TWIST DISTRIBUTION FOR A HIGH SPEED ROTARY-WING AIRCRAFT

(75) Inventors: Ashish Bagai, Hamden, CT (US); Lauren Kreuscher, New Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 450 days.

(21) Appl. No.: 11/508,414

(22) Filed: Aug. 23, 2006

(65) Prior Publication Data

US 2007/0110582 A1 May 17, 2007

Related U.S. Application Data

(63) Continuation-in-part of application No. 11/140,706, filed on May 31, 2005, now Pat. No. 7,252,479.

(51) Int. Cl.
*B64C 27/46* (2006.01)
(52) U.S. Cl. .............. 416/223 R; 416/238; 416/DIG. 2; 416/DIG. 5
(58) Field of Classification Search ............. 416/223 R, 416/228, 238, DIG. 2, DIG. 5; 244/7 A, 244/17.11, 17.23, 39, 7 R
See application file for complete search history.

(56) References Cited

U.S. PATENT DOCUMENTS

| | | | | |
|---|---|---|---|---|
| 4,248,572 | A | * | 2/1981 | Fradenburgh ............... 416/228 |
| 4,880,355 | A | | 11/1989 | Vuillet et al. |
| 5,035,577 | A | | 7/1991 | Damongeot |
| 5,150,857 | A | * | 9/1992 | Moffitt et al. ............... 244/12.2 |
| 5,332,362 | A | | 7/1994 | Toulmay et al. |
| 5,351,913 | A | * | 10/1994 | Cycon et al. ................... 244/60 |
| 5,364,230 | A | | 11/1994 | Krauss et al. |
| 5,419,513 | A | | 5/1995 | Flemming, Jr. et al. |
| 6,000,911 | A | * | 12/1999 | Toulmay et al. ......... 416/223 R |
| 6,116,857 | A | | 9/2000 | Splettstoesser et al. |
| 6,364,615 | B1 | | 4/2002 | Toulmay et al. |
| 6,497,385 | B1 | | 12/2002 | Wachspress et al. |

OTHER PUBLICATIONS

International Search Report and Written Opinion mailing date Jul. 18, 2008.
J. Gordon Leishman, Shreyas Ananthan; Aerodynamic Optimization of a Coaxial Proprotor, Department of Aerospace Engineering, Glenn L. Martin Institute of Technology, University of Maryland.
Correspondence dated Jan. 21, 2009 from Dr. Gayatri Varma, Director, Office of Technology Commercialization, University of Maryland College Park.

* cited by examiner

*Primary Examiner*—Igor Kershteyn
(74) *Attorney, Agent, or Firm*—Carlson Gaskey & Olds

(57) ABSTRACT

Main rotor blades of the dual, counter-rotating, rigid coaxial rotor system exhibit a unique unconventional combination of positive and negative twist gradients in which the rotor system rotor Figure of Merit (hover efficiency) is improved by providing a dissimilar twist distribution between the lower rotor blade and the upper rotor blades. This improvement is specifically a result of reduced profile drag of the lower rotor system, achieved by driving the effective operating condition of the lower rotor blades to be similar to the upper rotor blade such that the tip drag losses of the lower main rotor have been reduced considerably using a mathematically vigorous approach. While minimal induced power consumption resulted due to the dissimilar lower main rotor twist, a significant profile power benefit is realized, resulting in the improved hover efficiency with essentially no reduction in rotor forward flight performance.

25 Claims, 14 Drawing Sheets

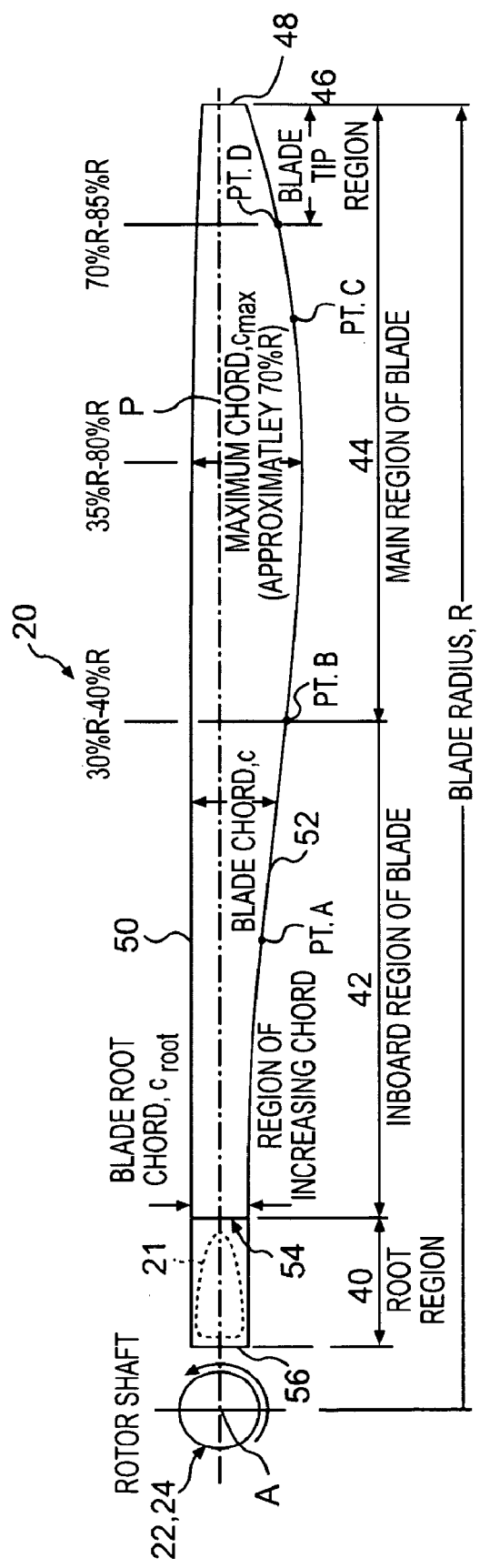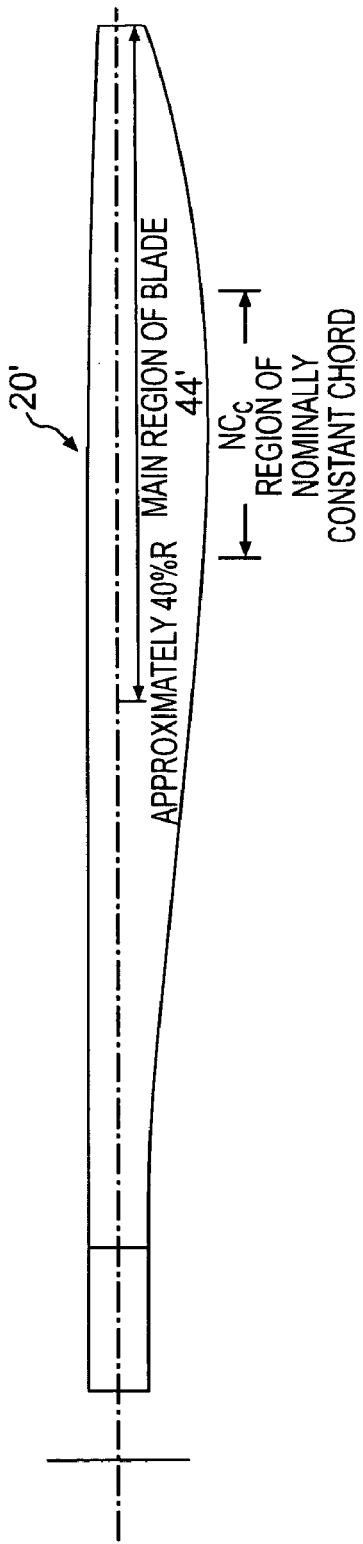
FIG. 2A
FIG. 2B

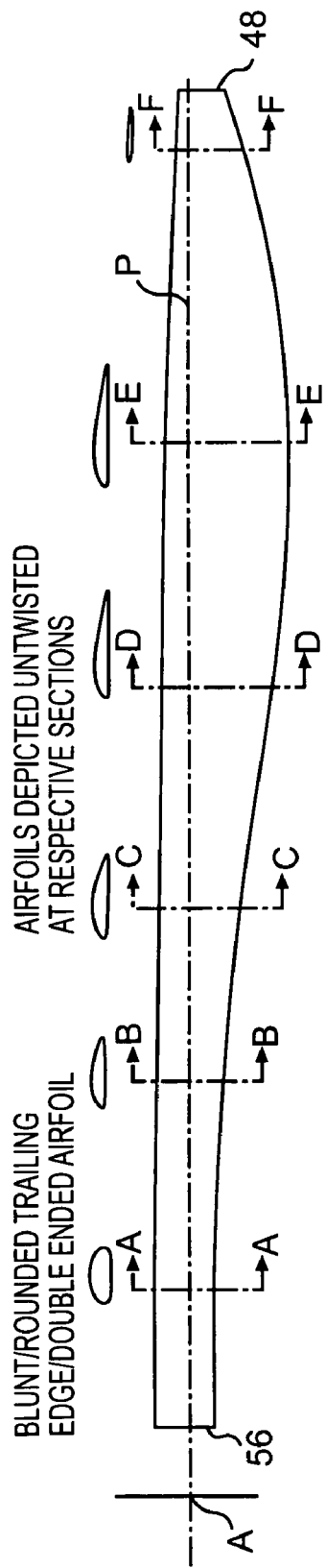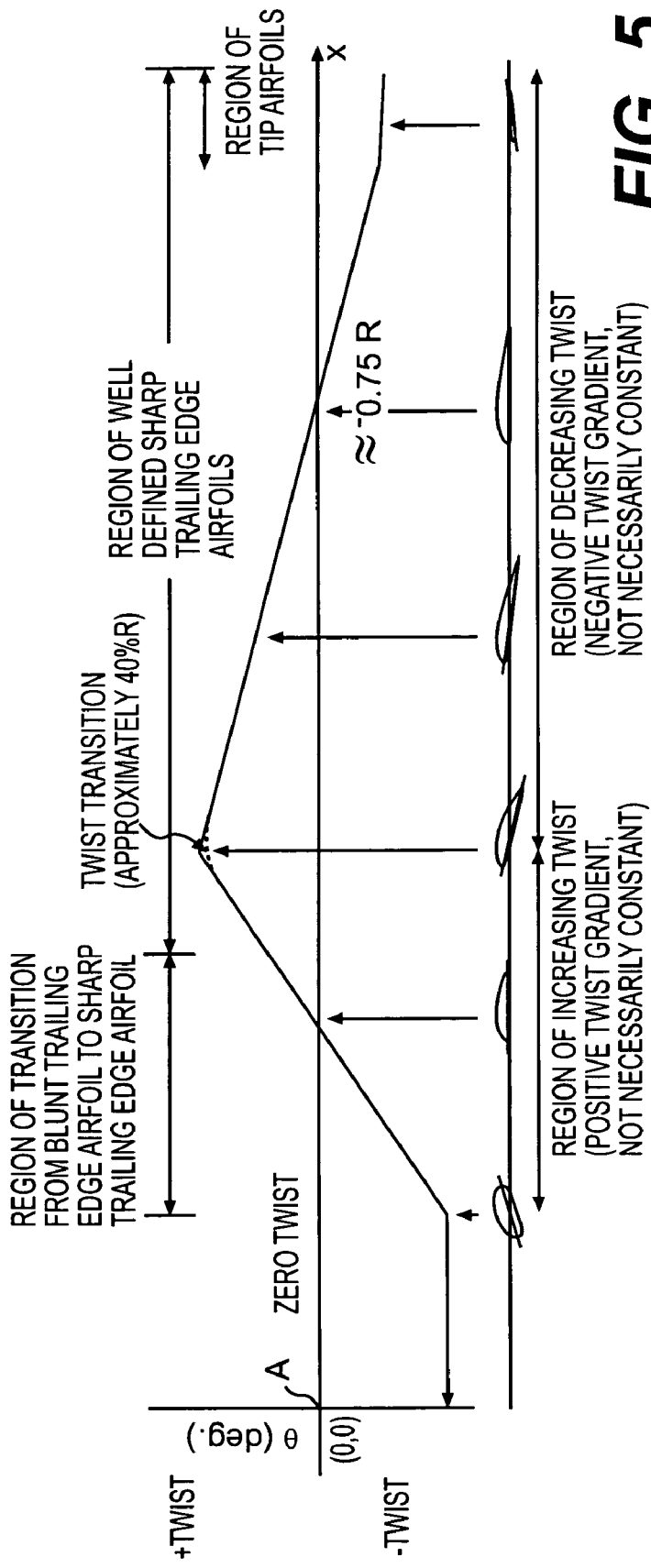

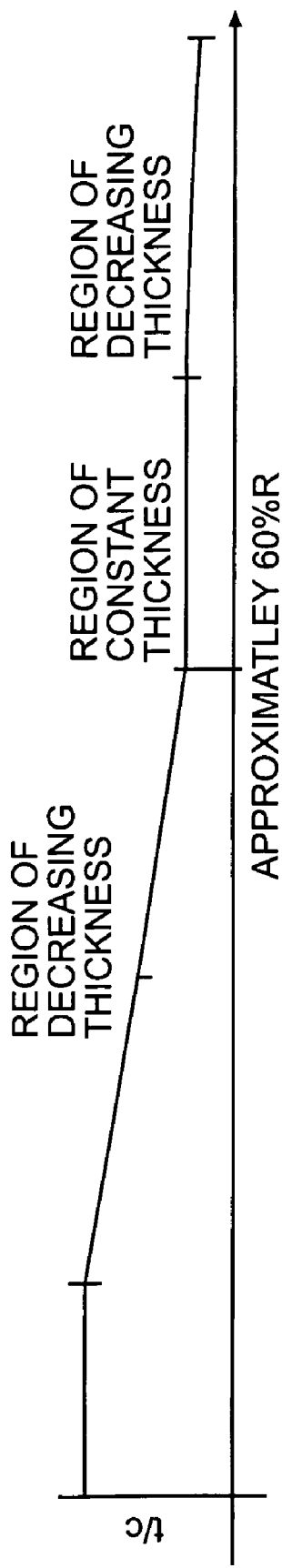
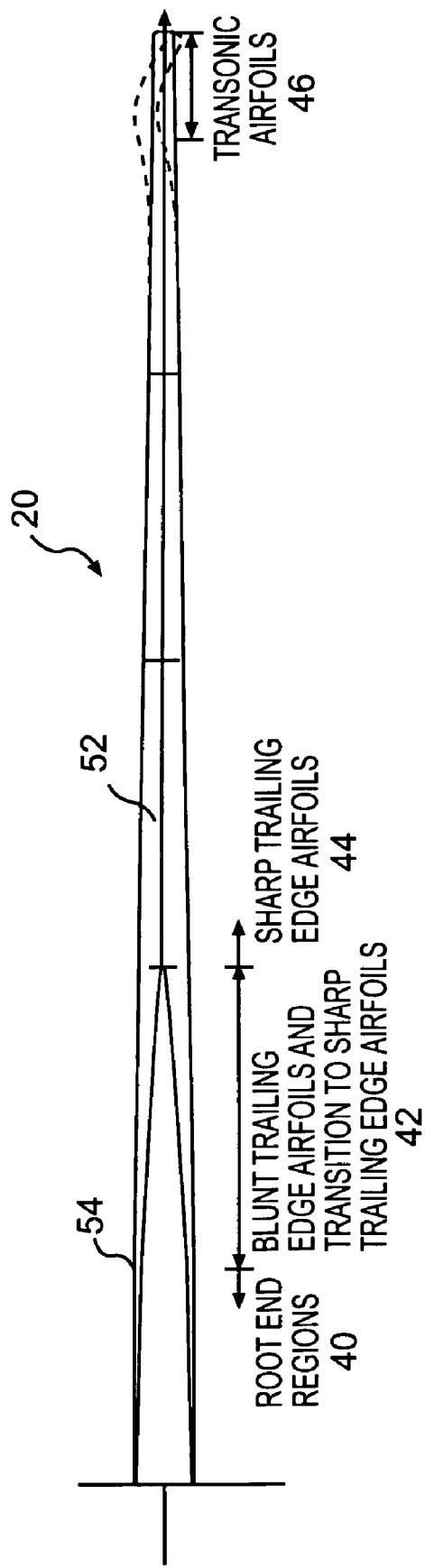
FIG. 4B
FIG. 4A

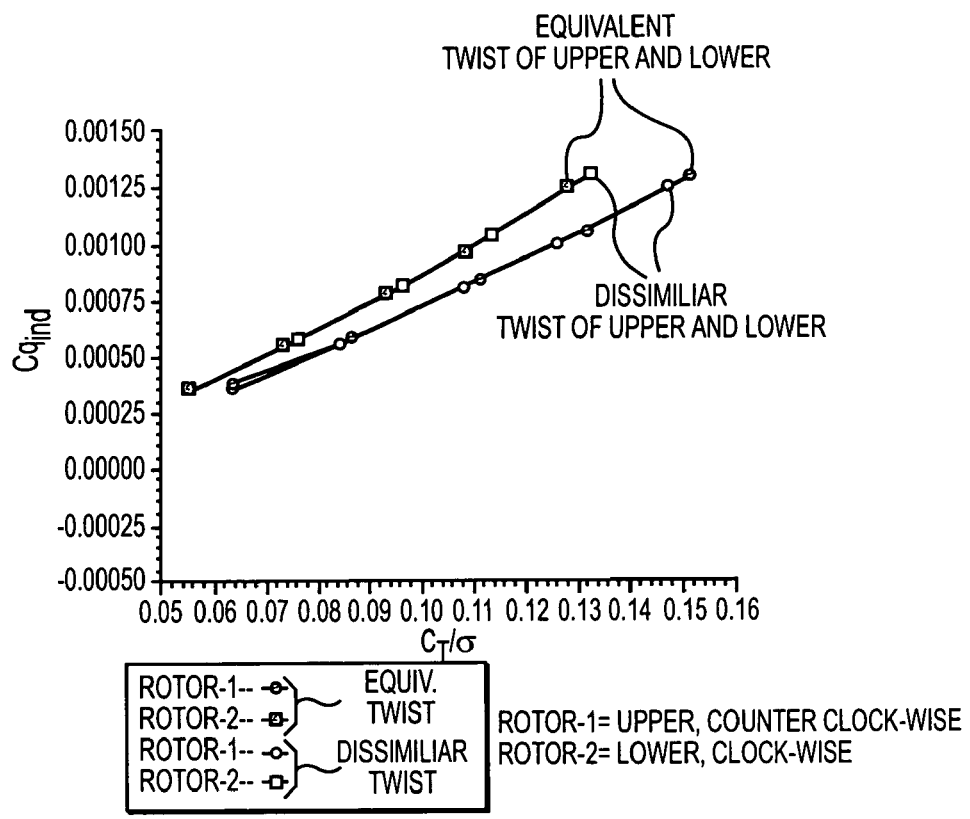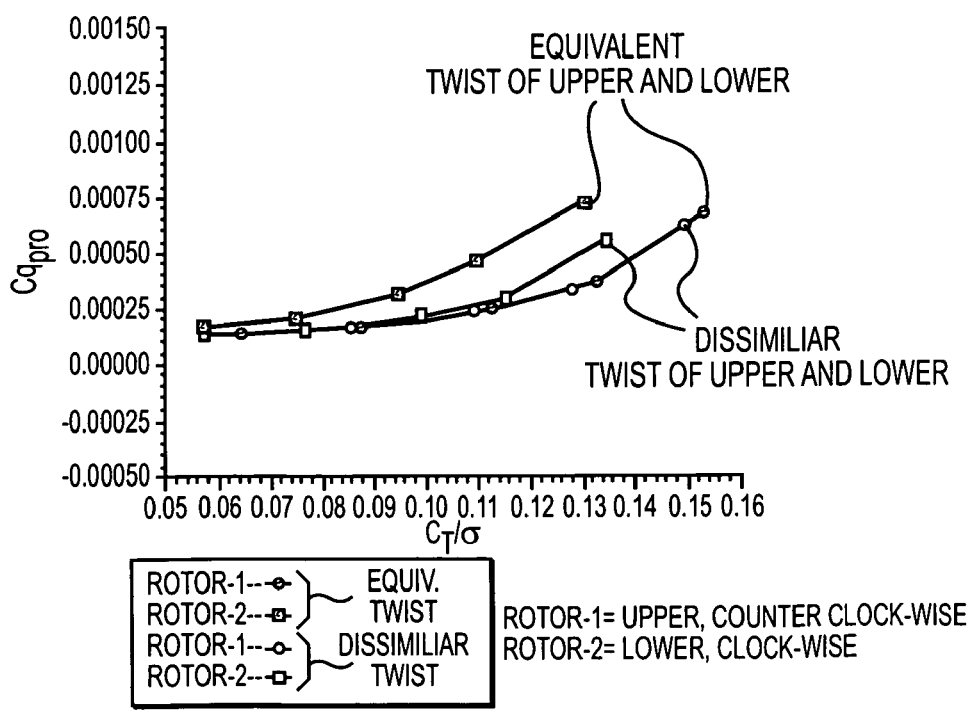
FIG. 16

ROTOR BLADE TWIST DISTRIBUTION FOR A HIGH SPEED ROTARY-WING AIRCRAFT

The present application is a continuation-in-part to U.S. patent application Ser. No. 11/140,706, filed May 31, 2005 now U.S. Pat. No. 7,252,479.

BACKGROUND OF THE INVENTION

The present invention is directed to a main rotor blade for rotary-wing aircraft and more particularly to a main rotor blade twist distribution for a rigid coaxial, counter-rotating rotary-wing aircraft capable of hovering and cruising at speeds in excess of 250 kts.

Conventional rotary-wing aircraft have a forward flight speed limited by a number of factors. Among these is the tendency of the retreating blade to stall at high forward flight speeds. As the forward airspeed increases, the airflow velocity across the retreating blade slows such that the blade may approach a stall condition. In contrast, the airflow velocity across the advancing blade increases with increasing forward speed. Forward movement of the aircraft thereby generates an asymmetry of lift between the advancing and retreating sides of the rotor. This asymmetry of lift may create an unstable condition if not equalized across the advancing and retreating sides of the rotor.

A rotary wing aircraft with a coaxial (or other) counter-rotating rigid rotor system is capable of higher speeds compared to single rotor helicopters due in part to the balance of lift between the advancing sides of the main rotor blades on the upper and lower rotor systems. In addition, the retreating sides of the rotors are also generally free from classic retreating blade stall that conventional single or dual rotor helicopters may suffer from because they are not required to produce lift.

To still further increase airspeed, such a rotary wing aircraft may incorporate an auxiliary translational propulsion system. Use of a rigid coaxial counter-rotating rotor system in combination with an auxiliary translational propulsion system, allows such a rotary-wing aircraft to attain significantly greater speeds than conventional rotary-wing aircraft, while maintaining hover and low speed capabilities.

One system significant to these flight attributes is the design of the main rotor system of which the rotor blades are the primary force and moment generating components. Design requirements for a rotary-wing aircraft incorporating a rigid counter-rotating rotor system differ significantly from conventional rotary-wing aircraft. As with a conventional rotary-wing aircraft, the advancing blades of both the upper and lower rotors produce lift; however, unlike a conventional single or multi-rotor rotary-wing aircraft, the retreating blades of the counter-rotating rotor are off-loaded commensurate with increasing flight velocity, and need not produce lift to balance lateral (rolling) moments. Rather, roll equilibrium is attained by balancing the net effects of the equal and opposite moments produced by the advancing side blades of the counter-rotating rotors. The ability to off-load the retreating blades from producing lift alleviates retreating blade stall—a primary cause of speed limitation on conventional rotary wing aircraft—thereby permitting much greater forward flight speeds to be achieved.

Another consequence of high-speed flight is that the tip Mach number encountered by the advancing blades of a high speed rotary-wing aircraft is significantly higher than for conventional rotary-wing aircraft, while the retreating blades on the counter-rotating rotor operate in significant regions of reversed flow. Typically, conventional rotary-wing aircraft are limited to advance ratios of 0.4 to 0.45, encounter advancing side blade tip Mach numbers within 0.80 to 0.85, and typically have no more than 45% of the retreating blades immersed in reverse flow in high speed flight. High speed compound rotary wing aircraft are designed to attain advance ratios approaching 1.0, and encounter advancing blade tip Mach numbers greater than 0.9. Without rotor RPM scheduling, in which rotor tip speed is reduced with increasing flight velocity, the advancing side rotor blade tips may exceed sonic velocities which may be accompanied by significant compressibility drag and blade vibratory loads. Moreover, significantly larger portions of the retreating blades are immersed in reversed flow at high speeds; typically as much as 80% at advance ratios of 0.8. Furthermore, blade loadings at high speeds, even under normal operating conditions, are significantly higher than for conventional rotary wing aircraft.

In order to preserve the helicopter attributes of a high speed rotary wing aircraft, it is important to optimize its hover performance. The hover Figure of Merit of the above described dual, counter-rotating, coaxial rotor system developed to date is approximately 0.78. This is not considered to be particularly impressive hover performance. However, the primary performance parameter for the rotor blade is concentrated on forward flight speed capabilities. For this reason, and also because sophisticated hover optimization analyses have heretofore been unavailable, high-speed coaxial rotor aircraft hover performance has heretofore been acceptable at the predicted level.

Accordingly, it is desirable to provide a rotor blade for a high speed rotary-wing aircraft flight envelope that includes forward flight at speeds in excess of 250 kts with improved hover performance to maintain efficient helicopter type attributes and slow flight capabilities.

SUMMARY OF THE INVENTION

A main rotor blade of a dual, counter-rotating, coaxial rotor system according to the present invention includes several geometric characteristics, including blade planform (chord), thickness, airfoil, and twist distributions. The design is an outcome of optimizing rotor performance and flight efficiency, while satisfying structural and aeroelastic requirements throughout an anticipated flight envelope. The main considerations of the blade design are: a) minimizing drag due to advancing side compressibility effects at the blade tips, b) reducing retreating side blade drag (over the reversed flow region), c) designing the rotor with sufficient blade area (solidity), d) maintaining blade aeroelastic stability and, e) maintaining blade tip separations between the upper and lower rotors.

Advancing side compressibility effects are minimized through the selection of airfoils, thickness distribution, twist, blade sweep and rotor speed scheduling with flight velocity. Retreating side blade drag in reversed flow is minimized by the redistribution of blade chord from inboard regions to outer spanwise locations, twist tailoring and incorporating particular airfoils designed to minimize drag under reversed flow conditions. Blade area (rotor solidity) maximizes operating design point performance efficiency while maintaining sufficient maneuver margin. The design parameters are defined to ensure that blade aeroelastic and tip clearance requirements are satisfied as ascertained from independent structural-dynamic and aeroelastic analyses, while addressing manufacturing considerations.

The main rotor blades of the dual, counter-rotating, coaxial rotor system exhibit a unique unconventional combination of positive and negative twist gradients and may incorporate dissimilar twist distributions (rates) between the blades of the upper and lower rotors. The rotor system performance is improved by providing a dissimilar twist distribution between the lower rotor blades and the upper rotor blades, resulting in significant improvements in rotor hover efficiency (Figure of Merit). This improvement is a result of reduced profile drag of the lower rotor system, achieved by driving the effective operating condition of the lower rotor blades to be similar to the upper rotor blades such that the tip drag losses of the lower rotor blades have been reduced considerably. Minimal change in induced power consumption resulted from the dissimilar lower main rotor twist. Furthermore, improvements in hover efficiency were achieved with little compromise of rotor forward flight performance.

The present invention therefore provides a rotor blade and more specifically, the blade twist distributions, for a high speed rotary-wing aircraft flight which includes hovering and forward flight at speeds in excess of 250 kts.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a plan view of a rotor blade designed according to the present invention;

FIG. 2B is a plan view of another rotor blade designed according to the present invention with a nominally constant chord section;

FIG. 3 is a plan view of a rotor blade designed according to the present invention illustrating sectional views showing blunt trailing edge and sharp trailing edge airfoil sections along the span of an untwisted blade;

FIG. 4A is a trailing edge view of a rotor blade designed according to the present invention illustrating the blade thickness distribution characteristic;

FIG. 4B is a blade thickness distribution characteristic of a rotor blade designed according to the present invention illustrating the airfoil thickness to chord ratio (t/c) characteristic;

FIG. 5 is a graphical representation of airfoil twist gradient characteristic and associated pitch orientation of the airfoil sections along the span of the blade;

FIG. 6 illustrates graphically a chord distribution (top), thickness distribution (center), and twist (bottom). Upper and lower rotors are counter-rotating, but geometrically similar;

FIG. 16 illustrates an induced and profile power requirements for the rotor in hover-comparisons are for upper and lower rotors with identical/similar twist, and for upper and lower rotors with dissimilar lower rotor twist as per FIG. 11.

DETAILED DESCRIPTION OF THE PREFERRED EMBODIMENT

Figure 1:
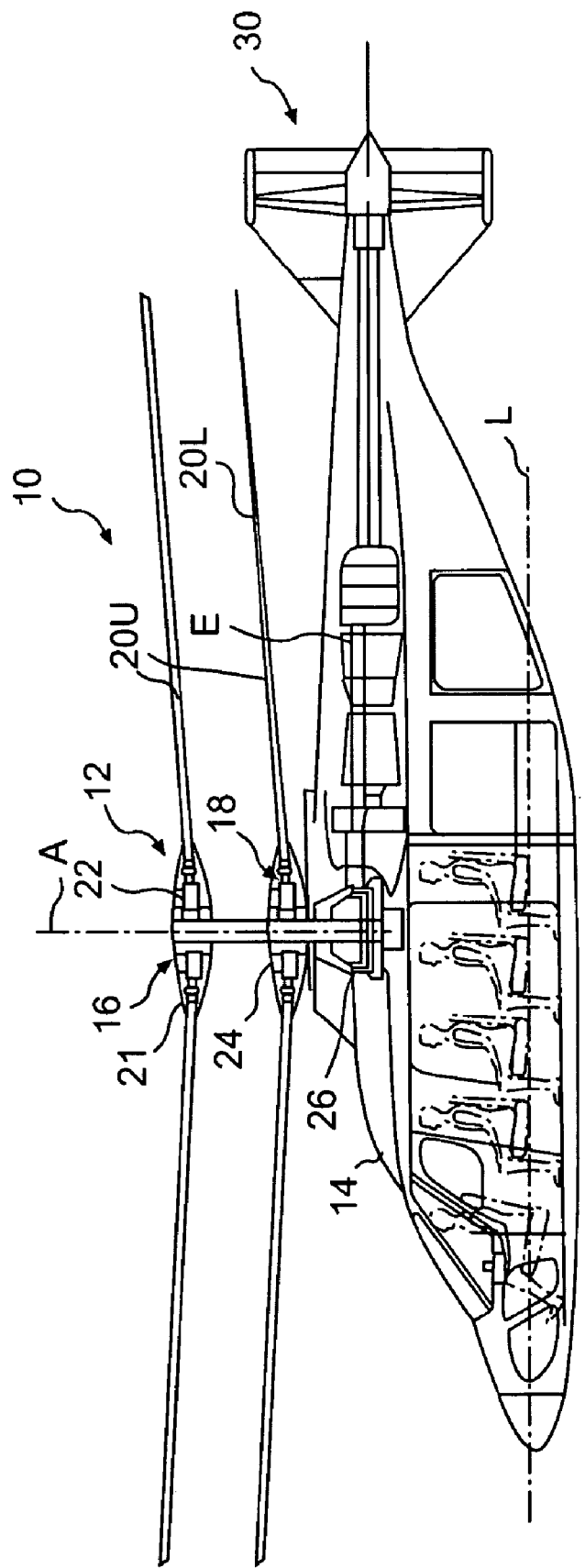
FIG. 1 is a general schematic view of an exemplary rotary wing aircraft embodiment for use with a coaxial rigid counter rotating rotor system incorporating the blades of the present invention.

FIG. 1 illustrates an exemplary vertical takeoff and landing (VTOL) high speed compound rotary-wing aircraft 10 having a dual, counter-rotating, coaxial rotor system. 12. The aircraft 10 includes an airframe 14 that supports the rotor system 12 as well as a propulsive system 30 which provides translational thrust generally parallel to an aircraft longitudinal axis L. Although a particular aircraft configuration is illustrated in the disclosed embodiment, other machines such as single rotor helicopters, turbo-props, tilt-rotor and tilt-wing aircraft will also benefit from the present invention.

The rotor system 12 includes a first rotor system 16 and a second rotor system 18. Each rotor system 16 and 18 includes a plurality of main rotor blades 20U, 20L mounted to a rotor hub assembly 22, 24 for rotation about a rotor axis of rotation A. The plurality of the main rotor blades 20U, 20L project substantially radially outward from each of the hub assemblies 22, 24 and are supported therefrom in one of numerous attachments arrangements typically including a blade cuff (illustrated schematically at 21). Any number of blades 20U, 20L may be used with the rotor system 12. The rotor system 12 is driven by a main gearbox 26 that is driven by one or more engines E.

FIG. 2A illustrates a general plan view of one upper rotor blade 20U designed according to the present invention which illustrates the basic chord distribution and the distribution of blade area relative to blade span. The rotor blades 20U, 20L can generally be divided into a root region 40, an inboard region 42, a main region 44, and a tip region 46. The root, inboard, main, and tip regions 40, 42, 44, 46 define the span of each rotor blade 20U, 20L and define a blade radius R between the axis of rotation A and a distal tip end 48 of the blade tip region 46. Each rotor blade 20U, 20L defines a leading edge 50 and a trailing edge 52, which define the chord C of the upper rotor blade 20U. A pitching or feathering axis P is the axis about which aerodynamic blade twist and feathering primarily occur.

The blade region extending inboard of approximately 30% R, and preferably inboard of 15% R, defines the root region 40 and includes the blade to hub attachment system 56 (and schematically illustrated in FIG. 1). Notably, each rotor blade 20U, 20L is mounted along the root region 40 so that the root region 40 has comparatively minimal aerodynamic significance since it is typically at least partially enclosed within the blade cuff 21 (illustrated schematically in FIG. 1). The blade cuff mounts each rotor blade 20U, 20L to the rotor hub assembly 22, 24 by any means known in the art and thus further detailed discussion need not be provided herein. The region of the blade that lies between the end of the root region 54 and main region 44 of the blade 20 is the inboard region 42.

Figure 2C:
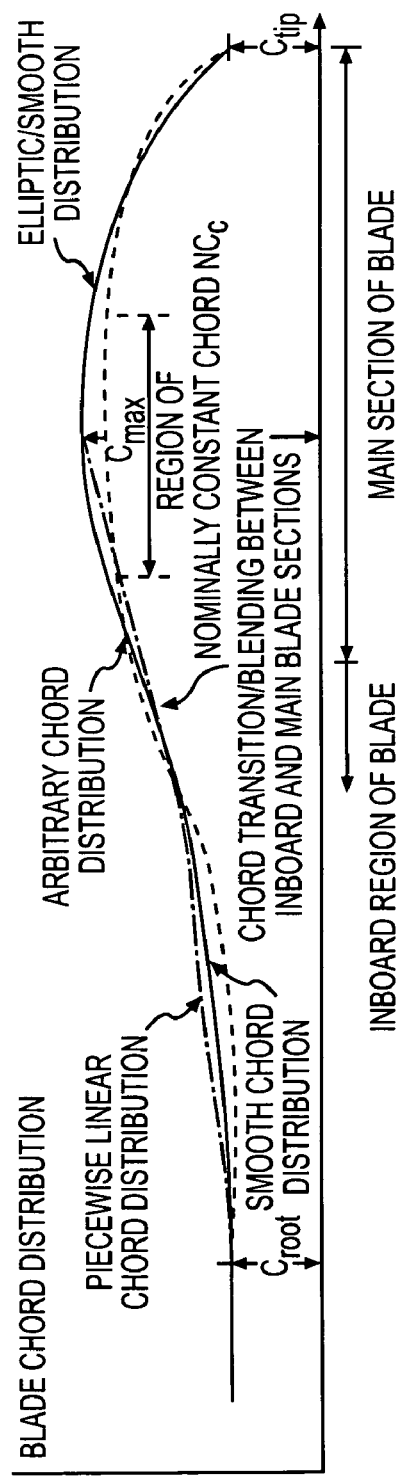
FIG. 2C is a graphical representation of blade chord distribution characteristics.

The blade design exhibits a unique shape in which the blade chord c may begin to increase adjacent the root region 40 over the length of the inboard region 42 and into the main region 44 of the blade 20U, 20L, achieves a maximum chord $c_{max}$ at a spanwise location within the main region 44, and then the blade chord c decreases toward the distal tip end 48 to form a "butter knife" shape. The blade chord distribution of the blade 20 is one in which preferably the blade chord c increases smoothly from the root region 40 to the maximum chord $c_{max}$ following a continuous curve, and in which the main region 44 of the blade is also a smooth curve which then smoothly tapers to the tip chord $c_{tip}$ (FIG. 2C).

In one illustration of the blade chord distribution, points A, B, C, and D shall be defined along the blade trailing edge 52. Point A and Point B are located within the inboard region 42 while point C and point D are located within the main region 44. Point A and Point B are located inboard of the main rotor blade maximum $c_{max}$ while point C and point D are located outboard of the main rotor blade maximum chord $c_{max}$. The blade chord increases between point A and point B and decreases between point C and point D. The main rotor blade maximum chord $c_{max}$ is located somewhere between point B and point C. Alternatively, the span between point B and point C may include a section of nominally constant chord $NC_c$ such that the trailing edge and the leading edge are generally parallel between point B and point C, yet include the maximum chord $C_{max}$. It should be understood that the location of points A, B, C, and D may be distributed over various spans and sections of the main rotor blade and that the location of points A, B, C, and D in FIG. 2A are for illustrative purposes only and should not be considered otherwise limiting. Furthermore, it should be understood that the span between point A and point B as well as the span between point C and point D may be located at various positions along the blade span as well as include sections of equivalent or different spans.

The position of the maximum chord $c_{max}$ is between 35% R and 85% R, preferably between 55% R and 80% R, and more preferably between 65% R and 75% R. The ratio of the root chord $c_{root}$ to maximum chord $c_{max}$ (FIG. 2C) is between 0.2 and 1.0, preferably between 0.3 and 0.8, and more preferably between 0.5 and 0.75. The ratio of tip chord $c_{tip}$ to maximum chord $c_{max}$ is anywhere from 0 to 1.0, but is preferably between 0.25 and 0.8.

The main region 44 of each blade 20U, 20L is the primary aerodynamic portion of each rotor blade 20U, 20L inclusive of the tip region 46. The main region 44 is defined to extend from 30% R to 100% R, but more preferably from 40% R to 100% R (FIG. 2A). The main region 44 preferably defines an elliptical distribution of blade area over span, although other distributions, such as, but not limited to parabolic or polygon distributions may also be utilized. One such alternative distribution includes a main region 44' in which a section of nominally constant chord $NC_c$ (FIG. 2B) is prescribed over a portion of the main region 44' of the blade 20' such that the trailing edge and leading edge are generally parallel over this section.

Referring to FIG. 2C, it is recognized that while the geometries depicted illustrate smooth and continuous transitions (solid line) between the inboard region 42 and main region 44 of each rotor blade 20U, 20L, this transition need not be smooth or continuous. The Elliptic/Smooth chord distribution (solid line) is comparable to an arbitrary smooth chord distribution, except that "Elliptic" specifically implies a chord distribution that is defined mathematically as an ellipse.

A piecewise linear chord distribution (dash-dot line) over the inboard region 42 is alternatively represented from the root chord $c_{root}$ to maximum chord $c_{max}$. The smooth chord distribution (solid line) is preferably from the root chord $c_{root}$ to the tip chord $c_{tip}$ with an elliptic chord variation over the main region 44 and tip region 46 with a smooth chord distribution over the inboard region 42. An "arbitrary chord distribution" including a section with nominally constant chord $NC_c$ is illustrated in FIG. 2C as a dashed line. The solid line, dashed line and dot-dash lines indicate that the chord variation over the span need not necessarily be smooth, or necessarily defined by a rigorous mathematical equation (ellipse, polynomial or any other equation). In other words, the chord variations may be smooth with mathematical definition (solid), a series of straight segments (multi-step piecewise distributions) (dot-dash line) or defined arbitrarily smooth, but not specifically mathematically smooth (dash). A section of constant chord $NC_c$ (dash line and FIG. 2B) may also adjust the distribution as noted by the variation near an inboard beginning of the region of nominally constant chord $NC_c$. "Arbitrary main chord variation" as defined herein is a blending of a series of points, possibly, but not necessarily using a mathematical expression. It should be understood that FIG. 2B depicts an alternative representation of the blade planform 20' (area distribution with span), but is still designed in accordance with the teachings of the present invention.

The blade tip region 46 typically lies over the outer 15% R to 30% R (70% R-100% R to 85% R to 100% R) of each the rotor blade 20U, 20L. The tip region 46 may be defined by several design characteristics that differentiate it from the main region 44, such as, for example, a transition to transonic airfoils, changes in twist and the incorporation of other geometric characteristics such as sweep, dihedral, and anhedral.

Figure 2D:
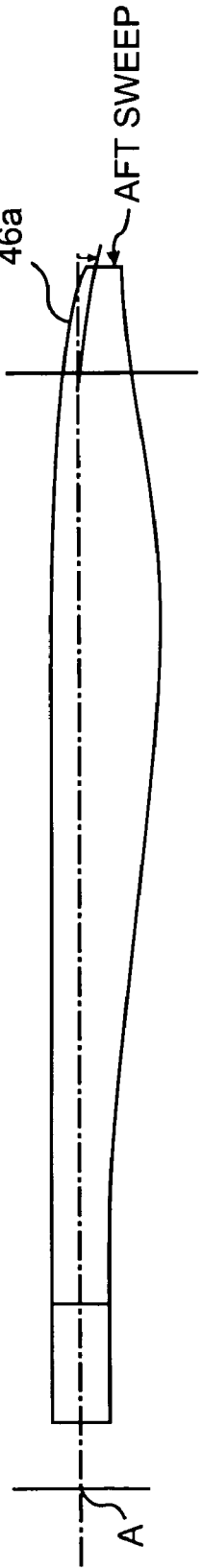
FIG. 2D is a plan view of another rotor blade designed according to the present invention with an aft swept tip.
Figure 2E:
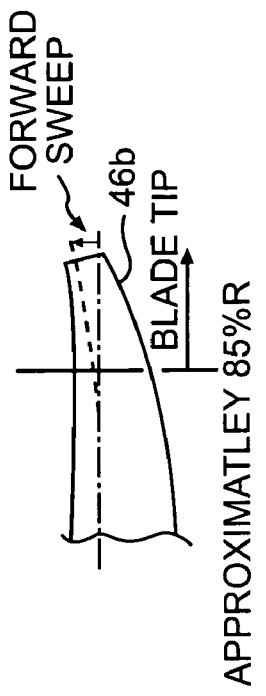
FIG. 2E is a plan view of another rotor blade designed according to the present invention with a forward swept tip.
Figure 2F:
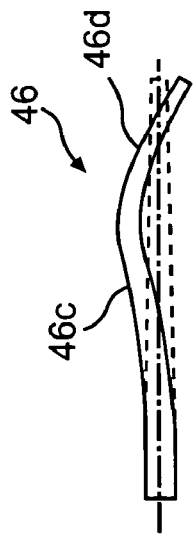
FIG. 2F is a trailing edge view of another rotor blade designed according to the present invention with dihedral/ anhedral tip.

In FIGS. 2A-2C, the tip region 46 is generally straight. Notably, the blade tip region 46 may taper at both the leading edge 50 and the trailing edge 52, however either may be tapered alone. Alternatively, the tip region 46 may be swept aft 46a (FIG. 2D) or swept forward 46b (FIG. 2E). Furthermore, the tip region 46 may include a dihedral section 46c, an anhedral section 46d or a combination thereof as defined when observed from a trailing edge view (FIG. 2F). It should be understood that various combinations of these tip characteristics may be utilized such as straight tips with anhedral, forward or aft swept tips with combined dihedral and anhedral, as well as others. Furthermore, continuously varying or multi-step piecewise distributions may also be utilized with the present invention as various radial segmentations of the blade tip region 46 that include sweep and dihedral/anhedral. Various sweep and dihedral/anhedral angles may are also be utilized.

Figure 2G:
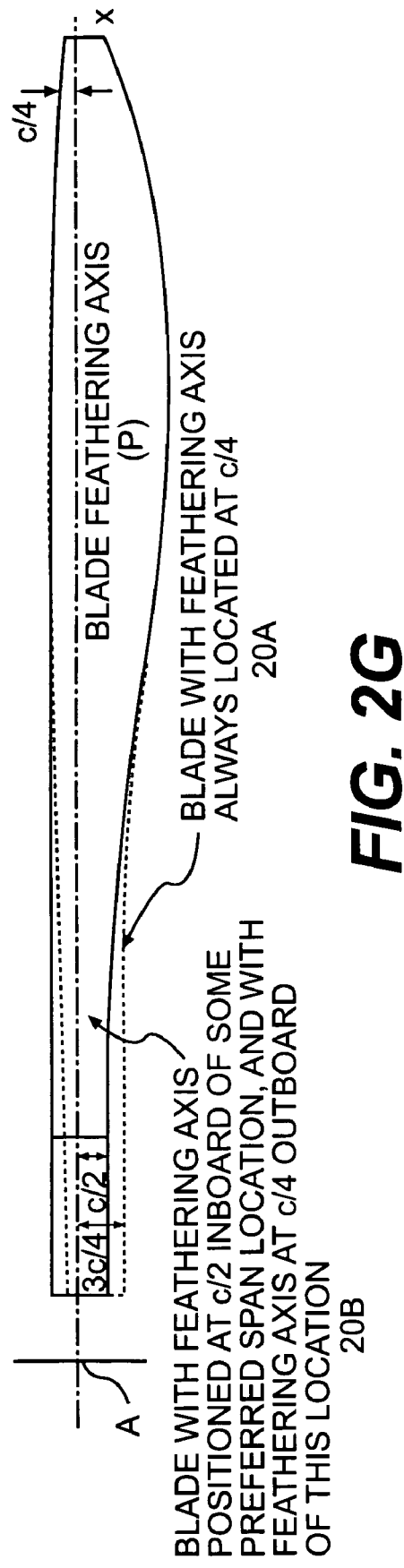
FIG. 2G is a plan view of a rotor blade designed according to the present invention illustrating alternative feathering axis position characteristics.

Referring to FIG. 2G, another characteristic feature of each rotor blade 20U, 20L designed according to the present invention is the location of the blade-feathering axis P. FIG. 2G illustrates each rotor blade 20U, 20L in plan view with the feathering axis P located in alternative positions. In one rotor blade 20UA, 20LA (dashed outline), the blade 20A defines the feathering axis P at the quarter chord (c/4) position as traditionally located on conventional rotor blades such that the feathering axis P nominally coincides with the location of the airfoil aerodynamic center of the blade section along the entire span.

In another rotor blade 20UB, 20LB (solid outline), the feathering axis is located at a mid chord (c/2) position over some inboard length of the upper rotor blade 20UB and then transitions to the quarter chord (c/4) location. The feathering axis is positioned at c/2 inboard of 40% R, and more preferably inboard of 30% R. The transition from the c/2 location to the c/4 location is defined to occur over a spanwise distance of 5% R to 50% R, but preferably over a spanwise distance of 10% R to 20% R. Over this transition distance, the feathering axis P is progressively shifted from the mid chord c/2 to the quarter chord line c/4, such that at the outboard 30% R to 50% R of the blade 20, the feathering axis P is located at the sectional quarter chord c/4. The mid chord (c/2) location within the root region 40 and inboard regions 42 of the upper rotor blade 20UB facilitates blade structural property distributions and manufacturing design considerations.

Referring to FIG. 3, the airfoil distribution along the blade span is illustrated in progressive root to tip sections A-A to F-F. Each rotor blade 20U, 20L preferably incorporates an airfoil distribution that changes from the root region 40 to the inboard region 42, the inboard region 42 to the main region 44, and from the main region 44 to the tip region 46. Typical blade cross-sections A-A to F-F taken along the blade span transverse to the feathering axis P illustrate the exemplary airfoils shown at zero pitch attitude in FIG. 3.

Within the root region 40 of the upper rotor blade 20U, and in particular at the blade root end 54 section A-A, the airfoil preferably includes a narrow chord and is relatively thick with particularly blunt trailing edges. The blunt trailing edge airfoils are preferably positioned between a distal root end 56 and approximately 35% R. Further outboard and typically within the inboard region 42 (FIGS. 2A and 5B), the airfoil shape transitions toward an airfoil (sections B-B and C-C) with a relatively sharp trailing edge profile prior to merging with the main region 44 of the upper rotor blade 20U. The transition from the blunt trailing edge to the sharp trailing edge airfoil occurs in the region that lies approximately between 30% R and 50% R (illustrated from the trailing edge in FIG. 4A). The main region 44 of the blade preferably utilizes airfoils (sections D-D and E-E) having sharp trailing edge airfoils suited for mid-range Mach number operation. The tip region 46 preferably utilizes a transonic flow airfoil (section F-F).

Referring to FIG. 4B, a blade thickness distribution characteristic of each rotor blade 20U, 20L is illustrated. The non-dimensional airfoil thickness to chord ratios (t/c), are graphically represented in FIG. 4B to generally correspond with a rear view of the trailing edge of each rotor blade 20U, 20L (FIG. 4A). The non-dimensional and dimensional variations are related directly to the airfoil distributions discussed previously, and serve to further illustrate the distribution of blade structural and aerodynamic properties. Notably, the root end region 40 is generally of constant thickness with a blunt trailing edge which tapers into a sharp trailing edge.

Referring to FIG. 5, another characteristic of each rotor blade 20U, 20L is a blade twist distribution. Each rotor blade 20U, 20L preferably incorporates an unconventional combination of positive and negative twist gradients. That is, from the root end 54 to approximately 35% R to 50% R, the blade preferably incorporates a positive twist gradient beginning with a negative twist at the root end 54. The twist rate over this region, however, need not be of constant rate, but may vary according to some smooth distribution, and/or include piecewise varying segments.

The twist over the main region 44 extending from 35% R to the start of the tip region 46 has a negative twist rate that may be constant, piecewise varying or continuously varying. The twist over the tip region 46 may be positively varying, negatively varying, constant or a combination. The blade twist of the airfoils at the blade cross-sections in FIG. 5 generally correspond to the cross-sections as illustrated in FIG. 3 to pictorially depict the relative blade twist at each section A-A to F-F. Notably, this equivalent twist distribution is the starting point for the dissimilar twist distribution of the present invention.

Figure 6:
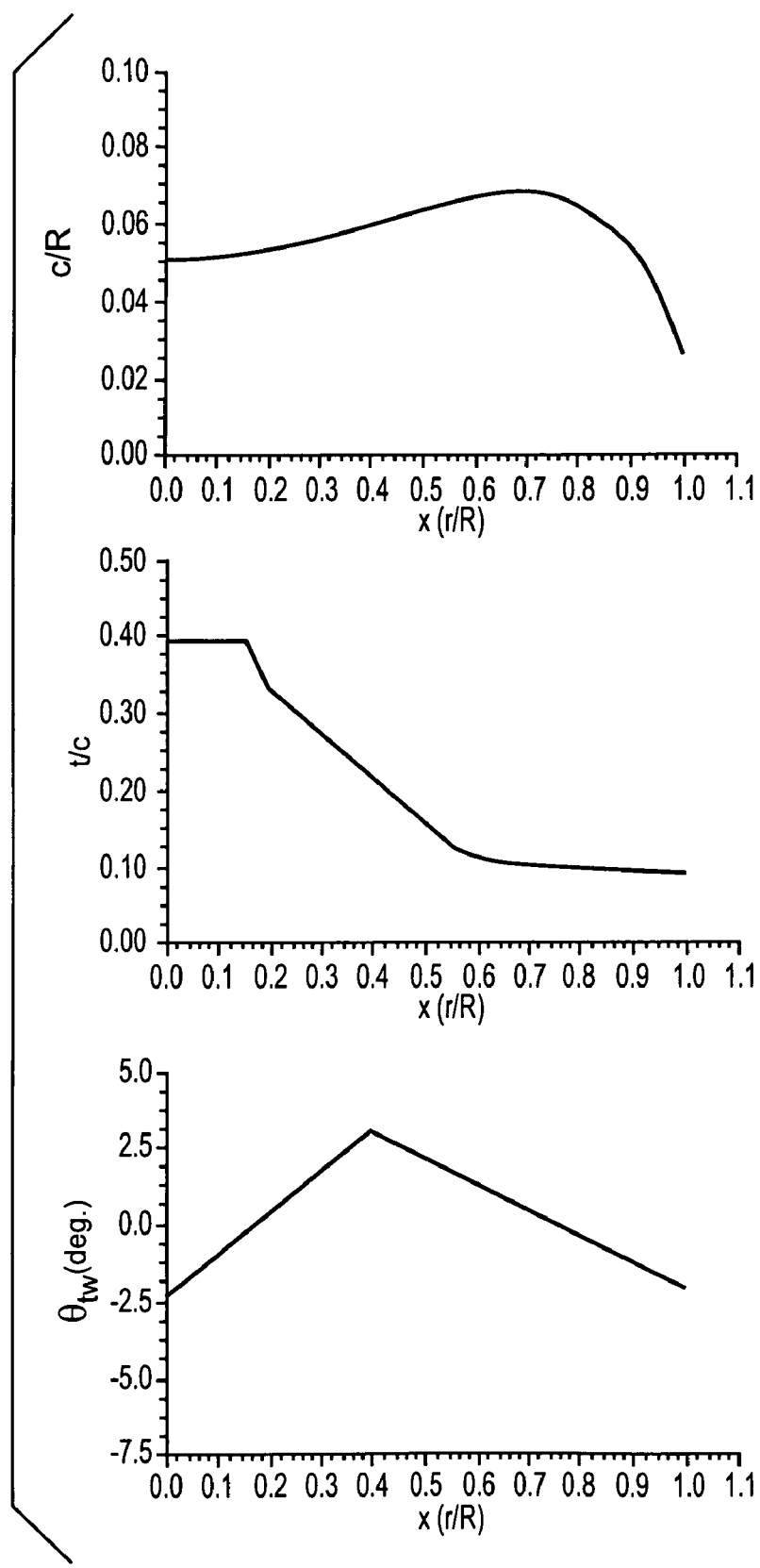

Referring to FIG. 6, aircraft chord, thickness (airfoil) and twist variations over blade span x(r/R) are illustrated in a comparative graphical format. By virtue of the planform, airfoils, t/c distribution and blade twist, the high speed envelope for the rotor blade was expanded significantly in terms of both, attainable speed capability, and rotor efficiency in forward flight.

Recently, more sophisticated methodologies that enable multi-rotor wake analyses, such as the Maryland Free-Wake Analysis (MFW), have been integrated into new aircraft design tools for rotor hover and forward flight performance evaluations. These models have enabled additional degrees of design fidelity that were previously not possible, such as aerodynamically fully coupled multi-rotor wake interference. The ability to evaluate such complex aerodynamic phenomena is essential for higher fidelity design analyses of advanced rotors in hover and forward flight including ABC designs with rigid blades. These capabilities have been presently exploited to further improve upon the hover performance with minimal impact on forward flight efficiency. More specifically, it is now possible to evaluate the operating environment of each rotor of a coaxial design while accounting for the induced effects of the other rotor. That is, the design of each rotor blade may be optimized while accounting for the presence of the other. The present invention describes the application of the coupled MFW and coaxial rotor design methodology to improving the hover performance of coaxial rotary-wing aircraft.

Figure 7:
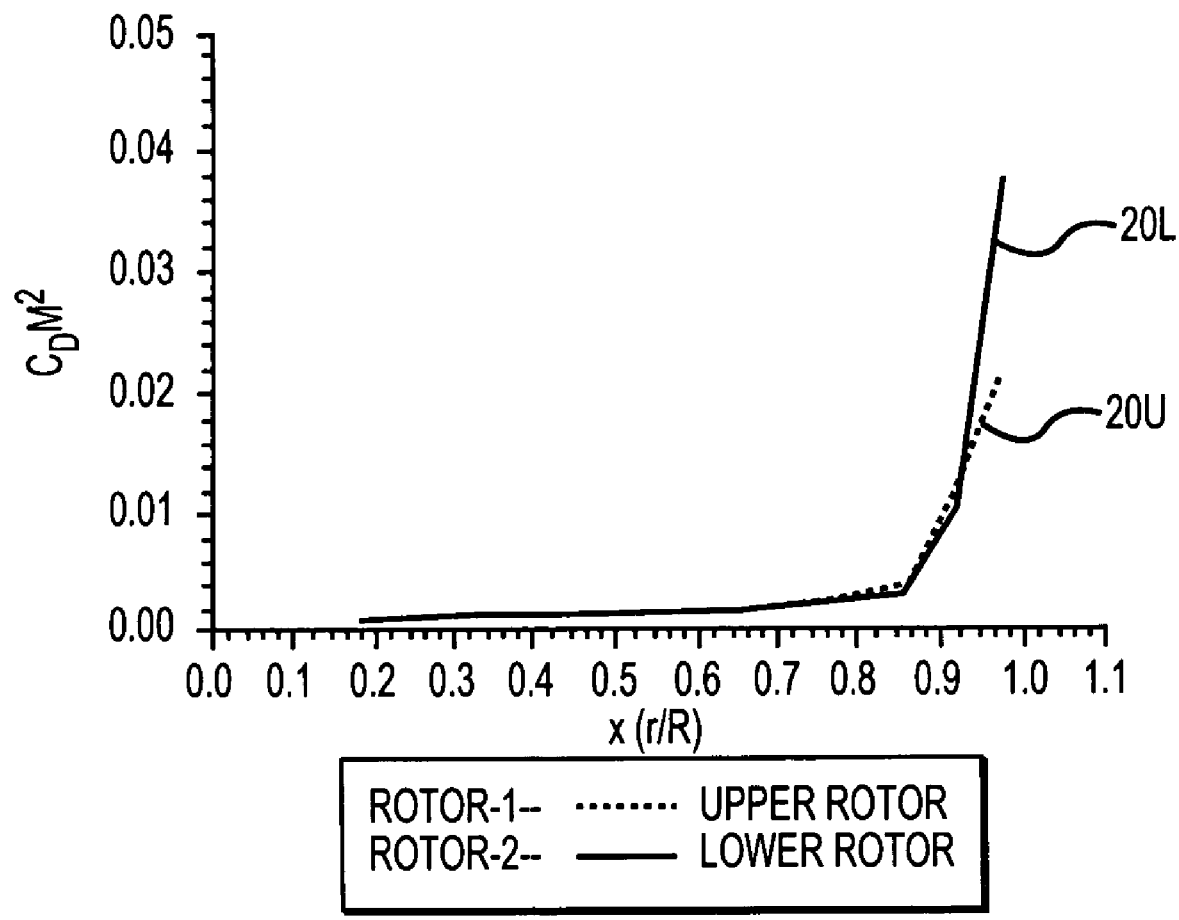
FIG. 7 illustrates an upper and lower rotor blade sectional drag variation in hover for geometry shown in FIG. 6.
Figure 8:
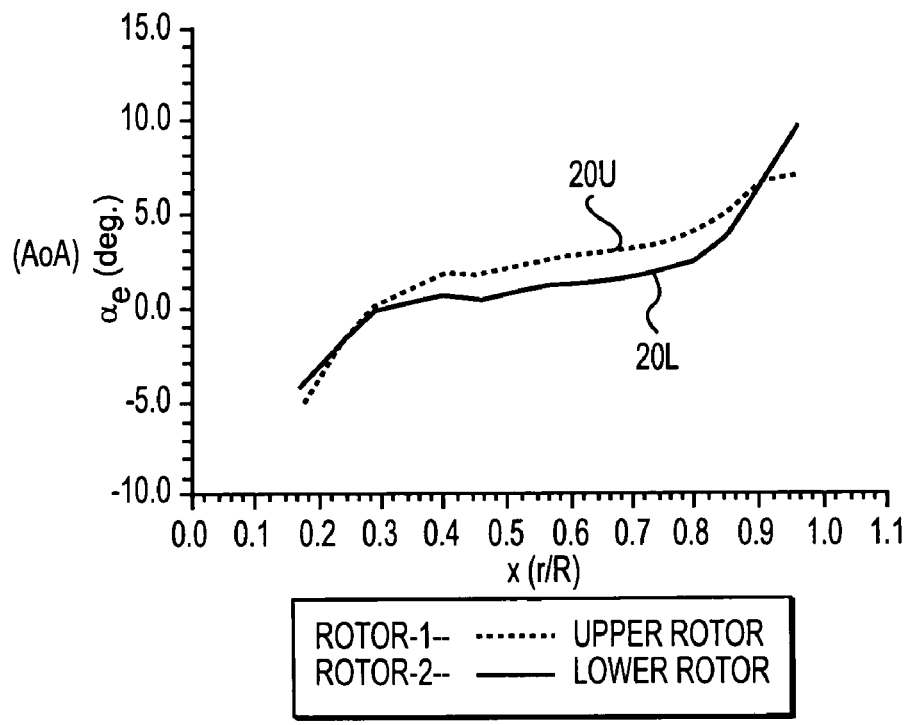
FIG. 8 illustrates an upper and lower rotor blade effective sectional angles of attack in hover for geometry of FIG. 6.

Referring to FIG. 7, the spanwise variation in blade drag along the span of the upper rotor blade 20U and the lower rotor blade 20L in hover is illustrated. The quantity $C_D M^2$ provides a measure of the drag penalty (and, thereby, required rotor torque or power) incurred over the rotor blade by including the effects of local dynamic pressure. It is clear from this figure that the drag losses for both, the upper rotor blade 20U, and the lower rotor blade 20L increase rapidly over the tip region of the blade (outboard of ≈85% R). This is because the high lift demand on the rotor system combines with the high taper over the outer portion of the blades, resulting in the blade tips becoming highly loaded in lift and consequently in associated drop. This, in addition to the high local Mach number over the blade tips, results in the rapid increase in blade tip drag. What is interesting, however, is that the drag over the tips of the lower rotor blade 20L is significantly higher than the drag of the upper rotor blade 20U albeit both rotors have the same geometries/design. A closer look at the blade sectional angles of attack for the upper and lower rotor (FIG. 8) illustrates that the blade tips (outboard from ≈80% R) of the lower rotor blade 20L in particular, are operating at significantly higher effective angles of incidence than the main (inboard) blade sections. This is a consequence of the angles of attack that are induced by the self and mutually interacting vortical wakes of the upper and lower rotor systems. By virtue of the axial convection and radial contraction of the upper and lower rotor system wakes, the induced angles of incidence are such that the tips of the lower rotor blades 20L encounter an induced upwash and become more excessively aerodynamically loaded. As further illustrated in FIG. 9, the lower main rotor blade tips are operating at angles of attack ($\alpha_e$) that exceed expected local steady stall angles of the airfoils.

Figure 9:
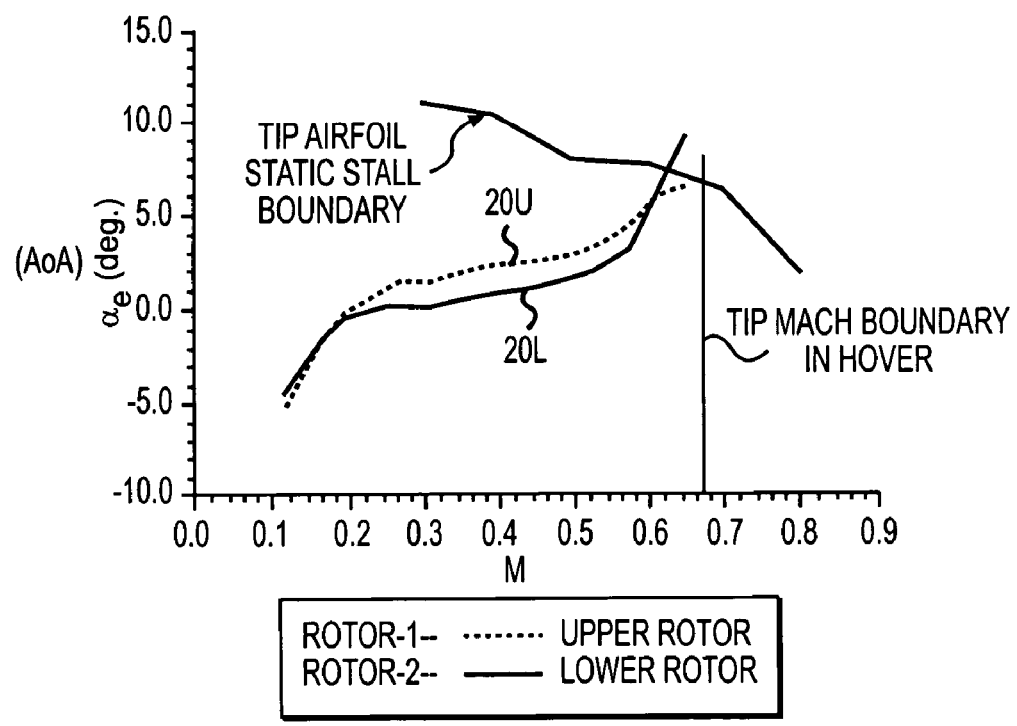
FIG. 9 illustrates an upper an lower rotor blade effective sectional angles of attack as a function of local blade sectional Mach number (profile drag from pressure) in hover for geometry of FIG. 6.

Referring to FIG. 9, the dependency of airfoil stall on Mach number is illustrated. Included in FIG. 9 is the static stall boundary of the tip airfoil, from which it can be seen that the operational angles of attack at the tips of the lower rotor blades 20L at the hover design conditions exceed the tip airfoil stall angles. The operating hover tip Mach number is indicated by the vertical line at 0.661.

One approach to reducing blade tip stall for a rotor blade is to reduce the operating tip Mach numbers of the blades by changing the design rotor rotational speed. Another possibility is to introduce tip sweep to attenuate the onset Mach number. However, the design rotor tip speed is based on various factors in addition to rotor performance considerations, and the use of tip sweep, although an important and recognized design feature, may not necessarily diminish the dissimilarities between upper and lower rotor blade tip drag losses due to induced effects.

Another effective and powerful design parameter is the twist of the rotor blades. By recognizing that the lower rotor system can be made to operate in an effective aerodynamic environment that closely resembles the upper rotor, it is possible to reduce the drag losses incurred by it. The lower rotor twist disclosed herein does this by requiring that the lower rotor blades sectional effective angles of attack be equal to or close to the upper rotor operating blade angles in hover. Specifically, it can be stated that in hover:

$$[\alpha_e]_{UR} = [\alpha_e]_{LR} \quad (1)$$

$$\equiv [\theta_0 + \theta_{tw} + \alpha_i]_{UR} = [\theta_0 + \theta_{tw} + \alpha_i]_{LR} \quad (2)$$

$$\Rightarrow [\theta_{tw}]_{LR} = [\theta_0 + \theta_{tw} + \alpha_i]_{UR} - [\theta_0 + \alpha_i]_{LR} \quad (3)$$

Where, UR is "Upper Rotor," LR is "Lower Rotor," $\alpha_e$ is the effective angle of attack, $\theta_0$ is the specified rotor collective or control angle, $\theta_{tw}$ is the blade sectional twist angle, and $\alpha_i$ is the sectional induced downwash angle of attack. Note that $\alpha_e$, $\alpha_i$, and $\theta_{tw}$ are functions of blade spanwise location, and in general, blade azimuth angle (although under idealized hover conditions, the azimuthal dependency is essentially eliminated).

Equation (3) provides a relationship that describes the twist that should be specified on the lower rotor blades operating in the non-uniform downwash induced by the upper rotor blade of a coaxial rotor system in hover to ensure that the lower rotor blades are operating at the same effective angle of attack as the upper rotor blades. The limitation of this definition of lower rotor twist, however, is that even though $[\theta_{tw}]_{UR}$ may be known by design specification, the values of $[\theta_0]_{UR}$, $[\alpha_i]_{UR}$, $[\theta_0]_{LR}$, and $[\alpha_i]_{LR}$ are interdependent, sensitive to operating conditions and not known a priori. This means that at best, only an approximate value of $[\theta_{tw}]_{LR}$ can be obtained analytically based on some suitable design operating condition and assumed rotor interactional induced velocity field ($[\alpha_i]_{LR}$). While it is feasible to formulate and implement an iterative approach to converge to a solution of higher order of accuracy, a single step iteration was determined to be sufficient.

Applicant has recognized that the lower rotor blade 20L performance can be improved significantly by changing the lower rotor blade twist distribution from an initial starting condition where both rotors had the same twist (FIG. 6). Using the coaxial rotor hover performance at the primary hover design point, the twist for the lower rotor blades that satisfied Equation (2) was determined. This twist distribution was found to differ significantly from the original twist distribution, and is given by the solution of Equation (3) (graphically illustrated in FIG. 10).

Figure 10:
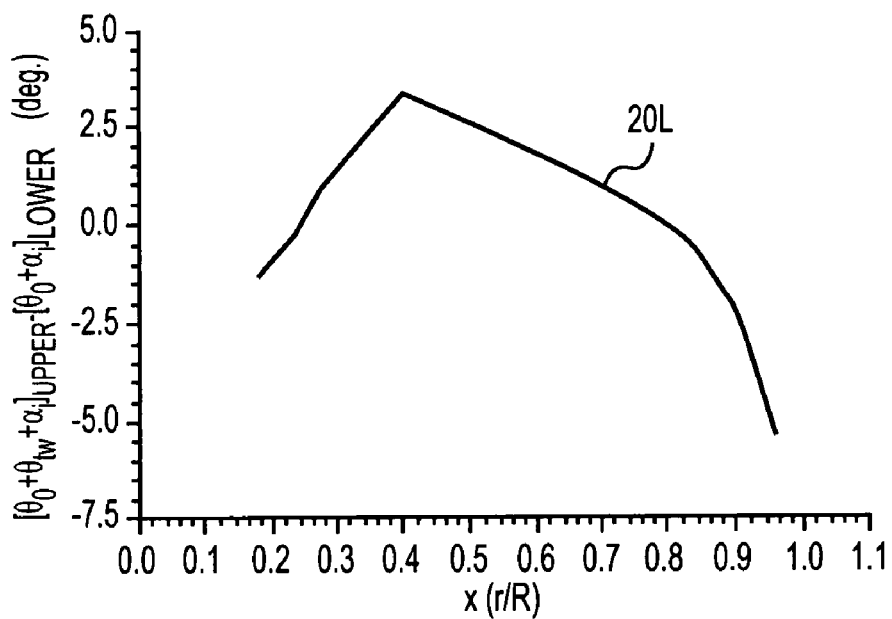
FIG. 10 illustrates the inventive computed twist distribution of the lower rotor blades in hover as determined from Eq. 3.
Figure 11:
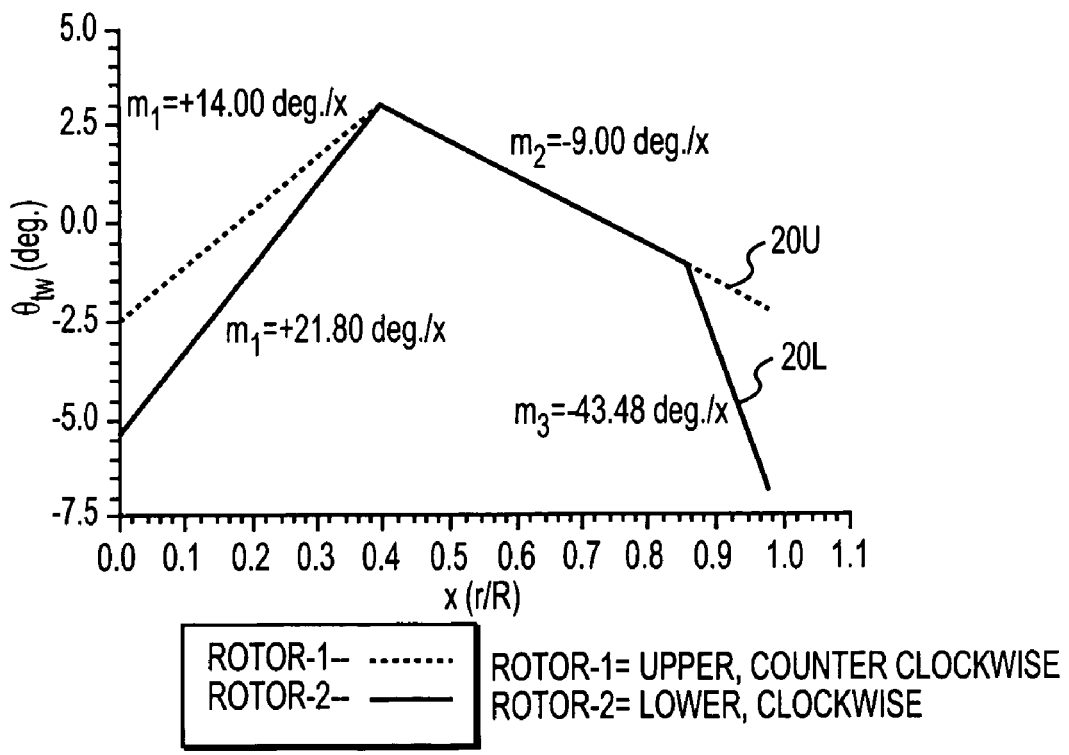
FIG. 11 illustrates the comparison of original and revised lower rotor blade twist distributions, former as determined from FIG. 6 (bottom), and latter as determined from FIG. 10.
Figure 12:
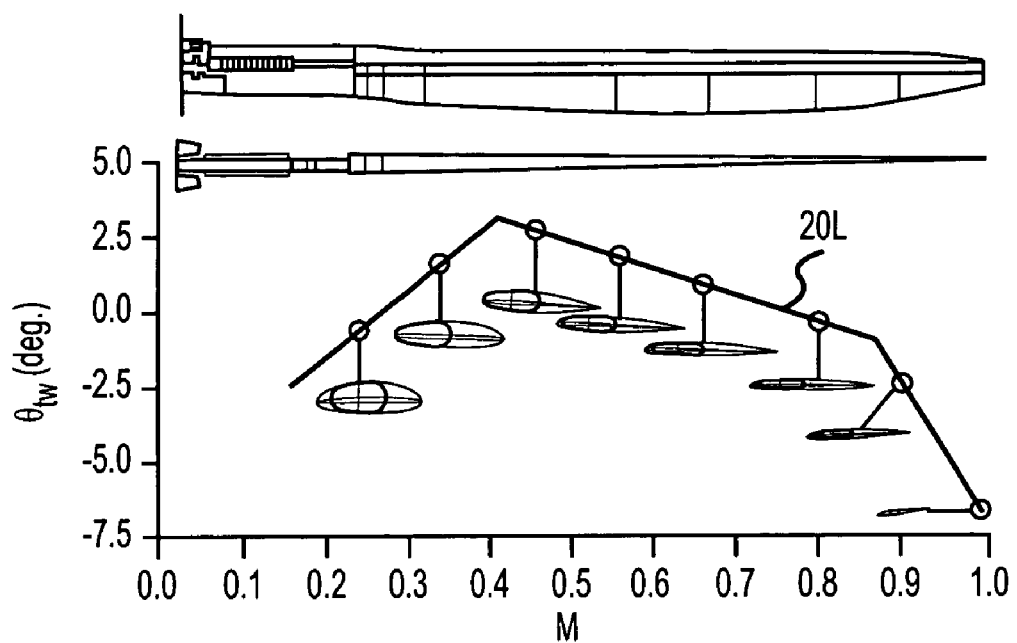
FIG. 12 illustrates the layout of the revised lower rotor blade geometry, including the platform view from trailing edge, modified twist and airfoil distributions as determined using the present inventive approach.

Referring to FIG. 10, an approximate, three segment piecewise linear approximation of the twist distribution was then used to model the lower rotor blades 20L and a comparison of the upper rotor blade 20U and lower rotor blade 20L twist distributions of the lower rotor twist is shown in FIG. 11, with a more detailed depiction of the lower rotor blade planform, twist and airfoil distributions being shown in FIG. 12.

Figure 13:
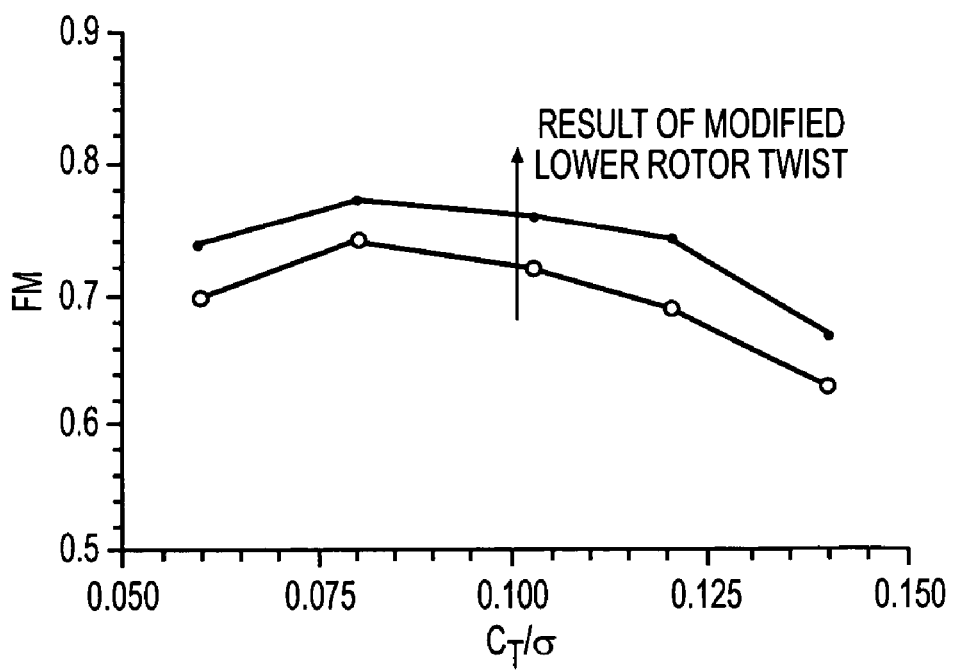
FIG. 13 illustrates an improvement in aircraft hover performance at design conditions due to the revised twist distribution over the lower rotor blades.
Figure 14:
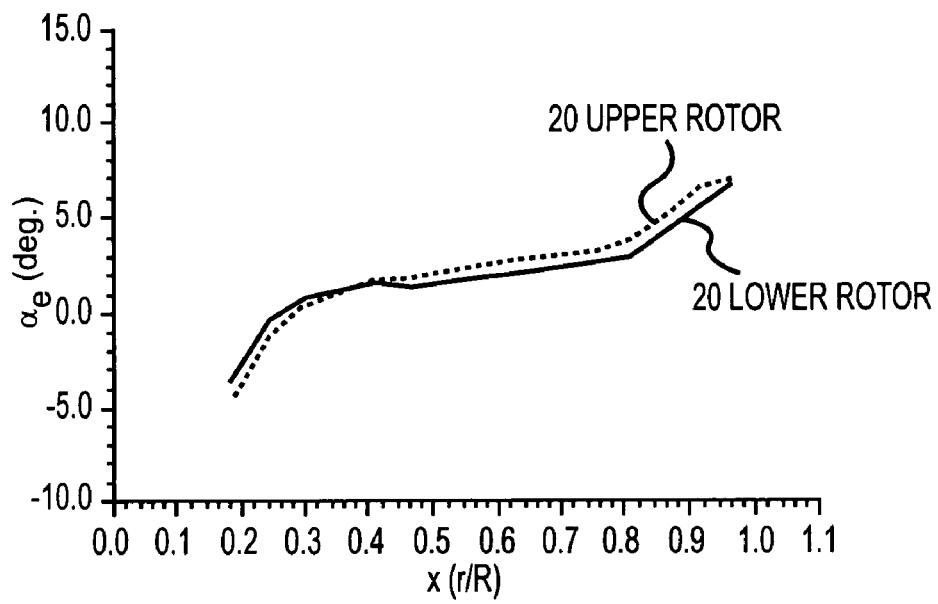
FIG. 14 illustrates a comparison of upper and lower rotor blade effective angles of attack with the revised lower rotor blade twist modification.

Hover performance (Figure of Merit) using the equivalent twist as well as with the dissimilar twist on the lower rotor blades is shown in FIG. 13. Significant improvements in rotor Figure of Merit (hover efficiency) are realized. This improvement is a result of reduced profile drag of the lower rotor system, achieved by driving the effective operating condition of the lower rotor blades to be similar to the upper rotor, as seen from FIG. 14 and as compared with FIG. 8.

Figure 15:
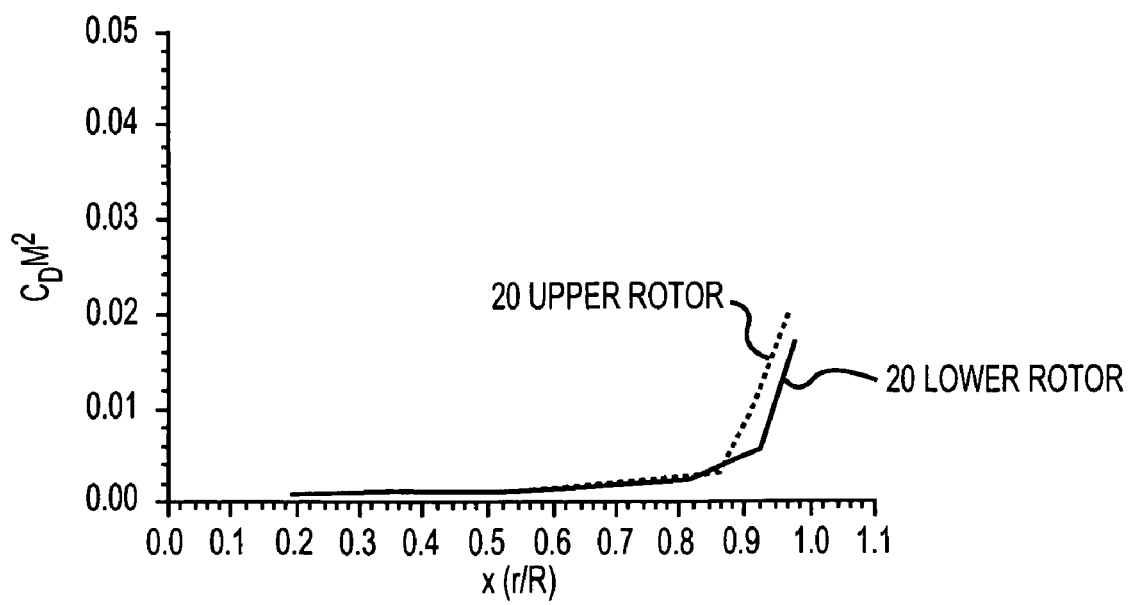
FIG. 15 illustrates an upper and lower rotor blade sectional drag variation in hover with revised lower rotor twist.

Referring to FIG. 15, the blade sectional drag distribution with the dissimilar lower main rotor blade 20L twist is shown. Comparing this with FIG. 7, it can be seen that the tip drag losses of the lower main rotor have been reduced considerably. The induced and profile power requirements of the upper and lower rotors of the original and revised twist are compared in FIG. 16. While little change in induced power (upper figure) consumption resulted due to the dissimilar lower main rotor twist, a significant profile power (lower figure) benefit is realized, resulting in the improved hover efficiency displayed in FIG. 13.

Figure 17:
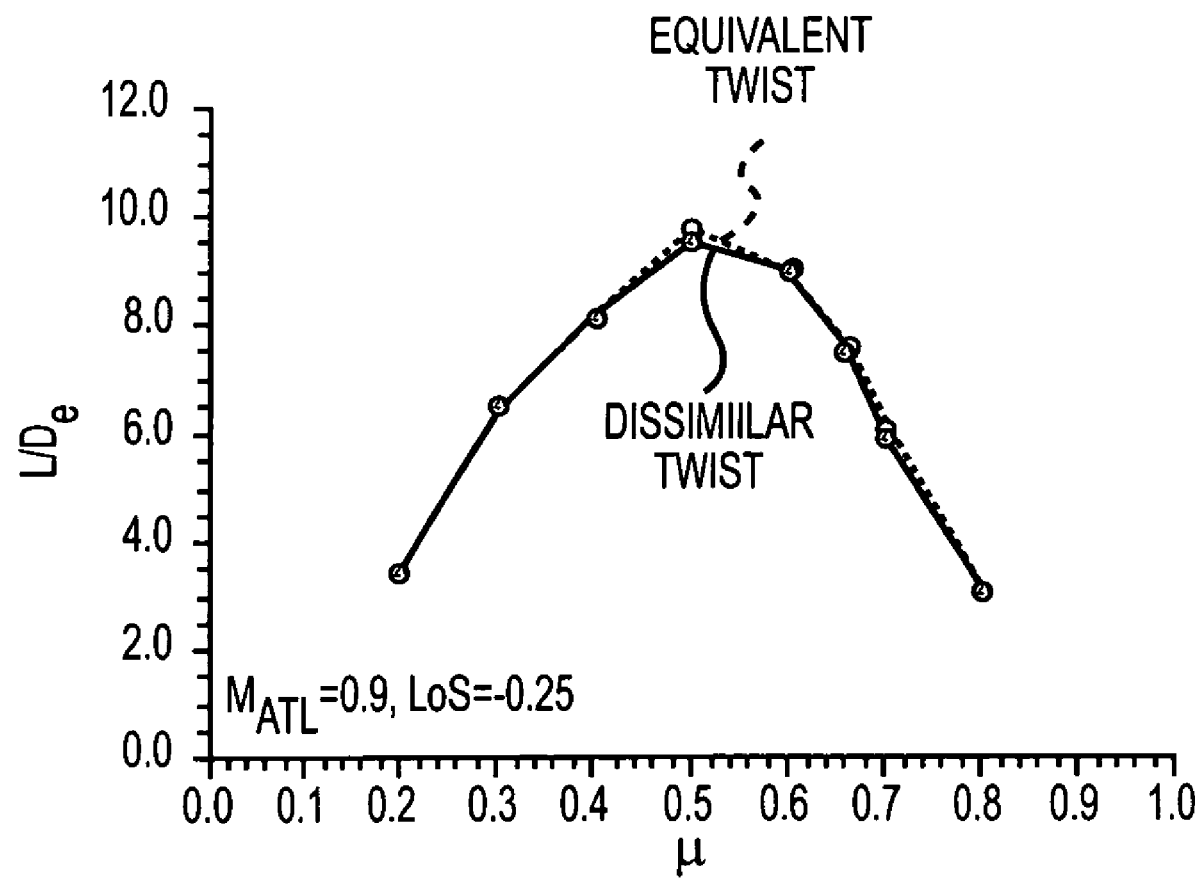
FIG. 17 illustrates comparisons of rotor efficiency in forward flight for the equivalent and dissimilar lower rotor twist.

While improvements in hover efficiency were achieved, the impact of the twist modification on forward flight performance was also evaluated. Comparisons of L/De for the two rotors are shown in FIG. 17, from which it is observed that essentially no reduction in rotor forward flight performance occurs as a result of the revised twist.

It should be understood by one of ordinary skill in the art, the various blade characteristics disclosed herein may be utilized singularly or in any combination depending on the particular design requirements of the aircraft. Moreover, although the invention has been generally described in connection with a rotary wing aircraft having counter-rotating rotors, the inventions is equally applicable to any aircraft including, but not limited to, single rotor helicopters, high-speed compound rotary wing aircraft, tilt-rotors, and such like.

It should be understood that relative positional terms such as "forward," "aft," "upper," "lower," "above," "below," "inboard," "outboard," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main rotor blade assembly for a rotary wing aircraft comprising:
    a main rotor blade root region containing a root region twist within said main rotor blade root region transverse to a feathering axis, said root region twist having a positive twist gradient;
    a main rotor blade inboard region outboard of said main rotor blade root region, said main rotor blade inboard region containing an inboard chord within said main rotor blade inboard region transverse to said feathering axis;
    a main rotor blade main region outboard of said main rotor blade inboard region, said main rotor blade main region containing a main region twist within said main rotor blade main region transverse to said feathering axis, said main region twist having a negative twist gradient;
    a main rotor blade tip region outboard of said main region, said tip, region containing a tip region twist within said main rotor blade tip region transverse to said feathering axis, said tip region twist having a negative twist gradient more negative than said main region twist gradient; and
    a blade chord defined between a leading edge and a trailing edge, said trailing edge defined along a root trailing edge of said main rotor blade root region, an inboard region trailing edge of said main rotor blade inboard region, a main region trailing edge of said main rotor blade main region and a tip region trailing edge of said main rotor blade tip region, said inboard region trailing edge defining a point A and a point B, said point B outboard of said point A, said main region trailing edge defining a point C and a point D, said point D outboard of said point C, said blade chord increasing between said point A and said point B and decreasing between said point C and said point D, said main rotor blade maximum chord located between said point B and said point C from said root attachment section to said main region section and decreasing from said main region section to said tip region section.

2. The main rotor blade assembly as recited in claim 1, wherein said root region twist gradient is greater than approximately 14 degrees/x (r/R).

3. The main rotor blade assembly as recited in claim 2, wherein said root region twist gradient transitions to said main region twist gradient at approximately 0.4x (r/R).

4. The main rotor blade assembly as recited in claim 1, wherein said root region twist gradient transitions to said main region twist gradient between 0.3x and 0.5x (r/R).

5. The main rotor blade assembly as recited in claim 1, wherein said main region twist gradient is between −14 and 0 degrees/x.

6. The main rotor blade assembly as recited in claim 5, wherein said main region twist gradient transitions to said tip region twist gradient at 0.865x (r/R).

7. The main rotor blade assembly as recited in claim 1, wherein said main region twist gradient transitions to said tip region twist gradient at above 0.8x (r/R).

8. The main rotor blade assembly as recited in claim 1, wherein said tip region twist gradient is less than −35 degrees/x (r/R).

9. The main rotor blade assembly as recited in claim 1, wherein a 0 degree twist occurs at approximately 0.20x and 0.75x (r/R).

10. The main rotor blade assembly as recited in claim 1, wherein said main region chord defines a maximum chord of said blade chord.

11. A dual, counter-rotating, coaxial rotor system comprising:
    an upper main rotor blade having an upper main rotor blade positive twist gradient which transitions to an upper main rotor blade negative twist gradient between 0.3 and 0.5 x (r/R); and
    a lower main rotor blade having a lower main rotor blade positive twist gradient which transitions to a first lower main rotor blade negative twist gradient between 0.3 and 0.5 x (r/R) which then transitions to a second lower main rotor blade twist gradient above 0.8 x (r/R) more negative than the first lower main rotor blade negative twist gradient,
    said upper main rotor blade and said lower main rotor blade each define a blade chord defined between a leading edge and a trailing edge, said trailing edge defined along a root trailing edge of a main rotor blade root region, an inboard region trailing edge of a main rotor blade inboard region outboard of said root trailing edge, a main region trailing edge of a main rotor blade main region outboard of said inboard region trailing edge, and a tip region trailing edge of a main rotor blade tip region outboard of said mm region trailing edge, said inboard region trailing edge defining a point A and a point B, said point B outboard of said point A, said main region trailing edge defining a point C and a point D, said point D outboard of said point C, said blade chord increasing between said point A and said point B and decreasing between said point C and said point D, said main rotor blade maximum chord located between said point B and said point C from said root attachment section to said main region section and decreasing from said main region section to said tip region section.

12. The system as recited in claim 11, wherein said upper main rotor blade negative twist gradient is generally equivalent to said first lower main rotor blade negative twist gradient over a main section.

13. The system as recited in claim 11, wherein said upper main rotor blade positive twist gradient is less than said lower main rotor positive twist gradient over an inboard section.

14. The system as recited in claim 11, wherein said upper main rotor blade positive twist gradient transitions to said upper main rotor blade negative twist gradient and said lower main rotor blade positive twist gradient transitions to said first lower main rotor blade negative twist gradient at a generally equivalent x (r/R).

15. A method of increasing a hover efficiency of a dual, counter-rotating, coaxial rotor system comprising:
    providing a dissimilar twist on a lower rotor blade relative to an upper rotor blade to change an operational angle of attack of a lower rotor blade tip section relative an operational angle of attack of an upper rotor blade tip section to reduce profile drag and profile power requirements, the upper main rotor blade and the lower main rotor blade each define a blade chord defined between a leading edge and a trailing edge, said trailing edge defined along a root trailing edge of a main rotor blade root region, an inboard region trailing edge of a main rotor blade inboard region outboard of said root trailing edge, a main region trailing edge of a main rotor blade main region outboard of said inboard region trailing edge, and a tip region trailing edge of a main rotor blade tip region outboard of said mm region trailing edge, said inboard region trailing edge defining a point A and a point B, said point B outboard of said point A, said main region trailing edge defining a point C and a point D, said point D outboard of said point C, said blade chord increasing between said point A and said point B and decreasing between said point C and said point D, said main rotor blade maximum chord located between said point B and said point C from said root attachment section to said main region section and decreasing from said main region section to said tip region section.

16. A method as recited in claim 15, further comprising:
driving the operational angle of attack of the lower rotor blade tip section to be generally equivalent to the upper rotor blade tip section.

17. A method as recited in claim 15, further comprising:
matching an effective angle of attack across a section of the lower rotor blade to be generally equivalent to an effective angle of attack across a section of the upper rotor blade.

18. A method as recited in claim 15, further comprising:
providing the dissimilar twist within a tip section of the lower rotor blade.

19. A method as recited in claim 15, further comprising:
providing the dissimilar twist on a root section of the lower rotor blade.

20. A method as recited in claim 15, further comprising:
determining the dissimilar twist on the lower rotor blades operating in the non-uniform downwash induced by the upper rotor blades in hover to ensure that the lower rotor blades are operating at essentially the same effective angle of attack as the upper rotor blades.

21. A method as recited in claim 15, further comprising:
determining the dissimilar twist on the lower rotor blade relative the upper rotor blade such that a negative twist gradient is given by the equation:

$$\Rightarrow [\theta_{tw}]_{LR} = [\theta_0 + \theta_{tw} + \alpha_i]_{UR} - [\theta_0 + \alpha_i]_{LR}$$

Where, UR is "Upper Rotor," LR is "Lower Rotor," $-\theta_0$ is the specified rotor collective angle, $\theta_{tw}$ is the blade sectional twist angle, and $\alpha_i$ is the sectional induced downwash angle of attack.

22. A method as recited in claim 15, further comprising:
matching an effective angle of attack across the tip section of the lower rotor blade to be generally equivalent to an effective angle of attack across the tip section of the upper rotor blade.

23. A method as recited in claim 22, further comprising:
locating a 0 degree twist at approximately 0.20x and 0.75x (r/R).

24. A method as recited in claim 15, further comprising:
matching an effective angle of attack across a main section of the lower rotor blade to be generally equivalent to an effective angle of attack across a main section of the upper rotor blade.

25. A method as recited in claim 15, further comprising:
matching an effective angle of attack across a root section of the lower rotor blade to be generally equivalent to an effective angle of attack across a root section of the upper rotor blade.

* * * * *

UNITED STATES PATENT AND TRADEMARK OFFICE
CERTIFICATE OF CORRECTION

PATENT NO. : 7,600,976 B2  
APPLICATION NO. : 11/508414  
DATED : October 13, 2009  
INVENTOR(S) : Bagai et al.

It is certified that error appears in the above-identified patent and that said Letters Patent is hereby corrected as shown below:

Claim 11, column 12, line 26: "mm" should read as --min--

Claim 15, column 12, line 66: "mm" should read as --min--

Signed and Sealed this

Fifteenth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,600,976 B2  Page 1 of 1
APPLICATION NO. : 11/508414
DATED : October 13, 2009
INVENTOR(S) : Bagai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Fifth Day of October, 2010

David J. Kappos
*Director of the United States Patent and Trademark Office*